(12) United States Patent
Ashoori et al.

(10) Patent No.: US 9,469,476 B1
(45) Date of Patent: Oct. 18, 2016

(54) SMART MAT FOR PACKAGE DELIVERIES

(71) Applicant: INTERNATIONAL BUSINESS MACHINES CORPORATION, Armonk, NY (US)

(72) Inventors: Maryam Ashoori, White Plains, NY (US); Sara H. Basson, White Plains, NY (US); Minkyong Kim, Scarsdale, NY (US); James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/949,931

(22) Filed: Nov. 24, 2015

(51) Int. Cl.
  *G06F 7/00* (2006.01)
  *B65G 1/137* (2006.01)
  *H04W 4/02* (2009.01)

(52) U.S. Cl.
  CPC ............... *B65G 1/137* (2013.01); *H04W 4/02* (2013.01)

(58) Field of Classification Search
  None
  See application file for complete search history.

(56) References Cited

U.S. PATENT DOCUMENTS

| | | | |
|---|---|---|---|
| 6,483,433 B2 | 11/2002 | Moskowitz et al. | |
| 6,957,767 B2 | 10/2005 | Aupperle et al. | |
| 7,436,325 B2 | 10/2008 | Bailey | |
| 7,525,429 B2 | 4/2009 | Carrigan | |
| 8,972,045 B1* | 3/2015 | Mountz | B65G 1/1373 700/213 |
| 2004/0140895 A1 | 7/2004 | Jordan | |
| 2007/0118488 A1 | 5/2007 | Bozzomo | |
| 2008/0004995 A1* | 1/2008 | Klingenberg | G06Q 10/08 705/28 |
| 2015/0120598 A1 | 4/2015 | Fadell et al. | |
| 2015/0183528 A1 | 7/2015 | Fadell et al. | |

OTHER PUBLICATIONS

P. Mell et al., "The Nist Definition of Cloud Computing", National Institute of Standards and Technology, Information Technology Laboratory, Sep. 2011, pp. 1-7.
Quick, Darren. "SmartMat Puts the Internet of Things Underfoot." gizmag.com, Mar. 28, 2014. <http://www.gizmag.com/smartmat-wi-fi-mat/31402/>.
Prigg, Mark. "Are Drones the Future of Delivery? U.S. Firm Plans Vast Network to Deliver Everything from Drugs to Post." dailymail.com. Associated Newspapers LTD, Jun. 1, 2013. <http://www.dailymail.co.uk/sciencetech/article-2333741/Are-DRONES-future-delivery-US-firm-plans-vast-network-deliver-drugs-post.html>.
"UVA Landing Mat—UAVLM." Faun Trackway Limited. Faun Trackway Limited, 2015. Web. <http://fauntrackway.co.uk/UAV-LANDING-MAT/>.
Lavars, Nick. "SkySense Pad Starts Changing Your Drone the Moment It Lands." gizmag.com, Nov. 4, 2014. <http://www.gizmag.com/skysense-pad-charging-drone-lands/34592/>.
"Empire Unmanned Aircraft Systems Receiving." Empire Unmanned Aircraft Systems Receiving. 2015. <http://www.uasreceiving.com/>.
Anonymous. "PZ Related GR Code Welcome Mat". IP.com, IPCOM000227922D, May 29, 2013.

* cited by examiner

*Primary Examiner* — Yolanda Cumbess
(74) *Attorney, Agent, or Firm* — Law Office of Jim Boice

(57) ABSTRACT

A method, system, and/or computer program product dynamically configures a delivery system for delivering products to smart mats. A delivery coordination server determines a location of multiple smart mats. Each of the smart mats includes a positioning system and a transmitter that transmits a message describing the real-time geophysical location of the smart mats. The delivery coordination server receives a message describing a location of a first delivery vehicle that is transporting a first package addressed for delivery to a first smart mat. The delivery coordination server determines that the first smart mat has moved to a location that is within a predetermined distance of a second smart mat, to which a second delivery vehicle is scheduled to deliver a second package. The delivery coordination server directs the first delivery vehicle to transfer the first package to the second delivery vehicle for delivery to the first smart mat.

20 Claims, 7 Drawing Sheets

SMART MAT FOR PACKAGE DELIVERIES

BACKGROUND

The present disclosure relates to the field of package deliveries, and specifically to the field of optimizing package delivery systems. Still more particularly, the present disclosure relates to optimizing package delivery systems through the use of smart mats.

SUMMARY

A method, system, and/or computer program product dynamically configures a delivery system for delivering products to smart mats. A delivery coordination server determines a location of multiple smart mats. Each of the smart mats includes: a positioning system that determines a real-time geophysical location of said each of the smart mats; and a transmitter that transmits a message describing the real-time geophysical location of each of the smart mats. The delivery coordination server receives a message describing a location of a first delivery vehicle that is currently transporting a first package addressed for delivery to a first smart mat from the multiple smart mats. The delivery coordination server determines that the first smart mat has moved to a location that is within a predetermined distance of a second smart mat, to which a second delivery vehicle is scheduled to deliver a second package. The delivery coordination server directs the first delivery vehicle to transfer the first package to the second delivery vehicle for delivery to the first smart mat.

DETAILED DESCRIPTION

Figure 1:
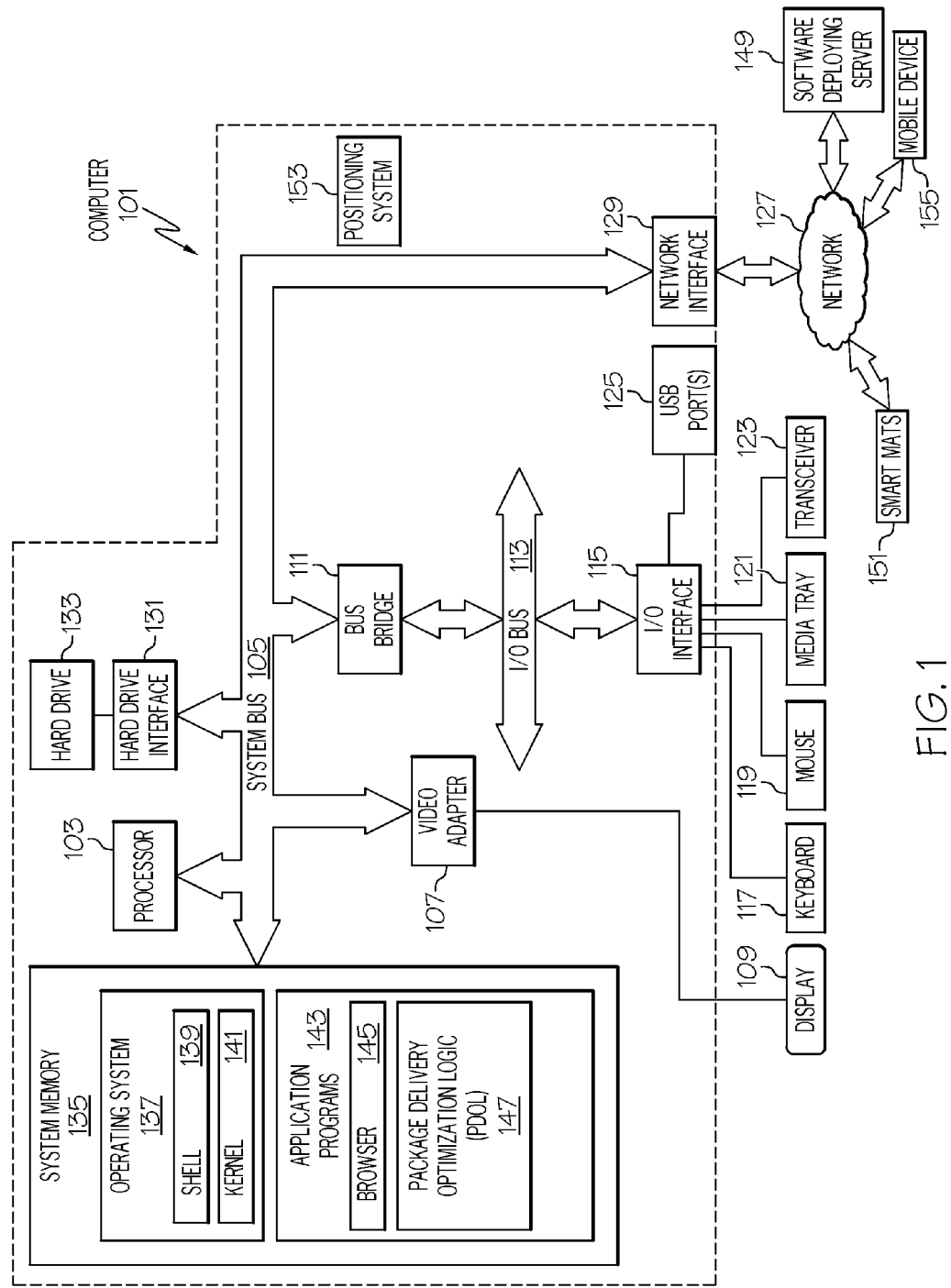
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 101 may be utilized by software deploying server 149 and/or smart mats 151 and/or mobile device 155 shown in FIG. 1, and/or smart mat 251 shown in FIG. 2, and/or delivery coordination server 301 and/or smart mats 351a-351c and/or mobile device 355 and/or incorporated into delivery vehicle 303 and delivery vehicle 307 shown in FIG. 3.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 118, a media tray 121 (which may include storage devices such as CD-ROM drives, multi-media interfaces, etc.), a transceiver 123 (capable of transmitting and receiving electromagnetic (e.g., radio frequency, near field communication—NFC signals, etc.) signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or smart mats 151 and/or mobile device 155 using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 133, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include a Package Delivery Optimization Logic (PDOL) 147. PDOL 147 includes code for implementing the processes described below, including those described in FIGS. 2-4. In one embodiment, computer 101 is able to download PDOL 147 from software deploying server 149, including in an on-demand basis, wherein the code in PDOL 147 is not downloaded until needed for execution. Note further that, in one embodiment of the present invention, software deploying server 149 performs all of the functions associated with the present invention (including execution of PDOL 147), thus freeing computer 101 from having to use its own internal computing resources to execute PDOL 147.

Smart mats 151 are portable pressure sensitive mats that are able to detect 1) a presence of a delivered object, 2) a weight of the delivered object, 3) a shape of the delivered object, 4) a location of a particular smart mat, and/or 5) an environment of a particular smart mat. As described herein, smart mats 151 are portable, such that they can be used to dynamically configure a delivery system. That is, rather than simply configure a delivery system to deliver to fixed addresses, smart mats 151 allow the system to deliver to wherever the smart mats 151 are located in real time. Thus, the smart mats 151 enable a system that is not based on fixed hubs delivering to fixed delivery locations, but rather utilize the real-time and changing locations of the smart mats 151 to define dynamic delivery locations that are used to define and/or adjust a delivery system dynamically.

Within or associated with computer 101 is a positioning system 153, which determines the physical location of computer 101 in real time. An exemplary positioning system 153 is a Global Positioning System (GPS) system that utilizes a system of space-based satellites to determine the geo-coordinate position of computer 101 in real time. Other embodiments of positioning system 153 utilize accelerometers, barometers, etc. that track movement of computer 101 and/or any device (e.g., a smart mat) associated with computer 101 and/or the positioning system 153.

Computer 101 is able to communicate with a mobile device 155, which is a user device such as a smart phone (i.e., a cellular phone capable of accessing the Internet), a tablet computer, etc.

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
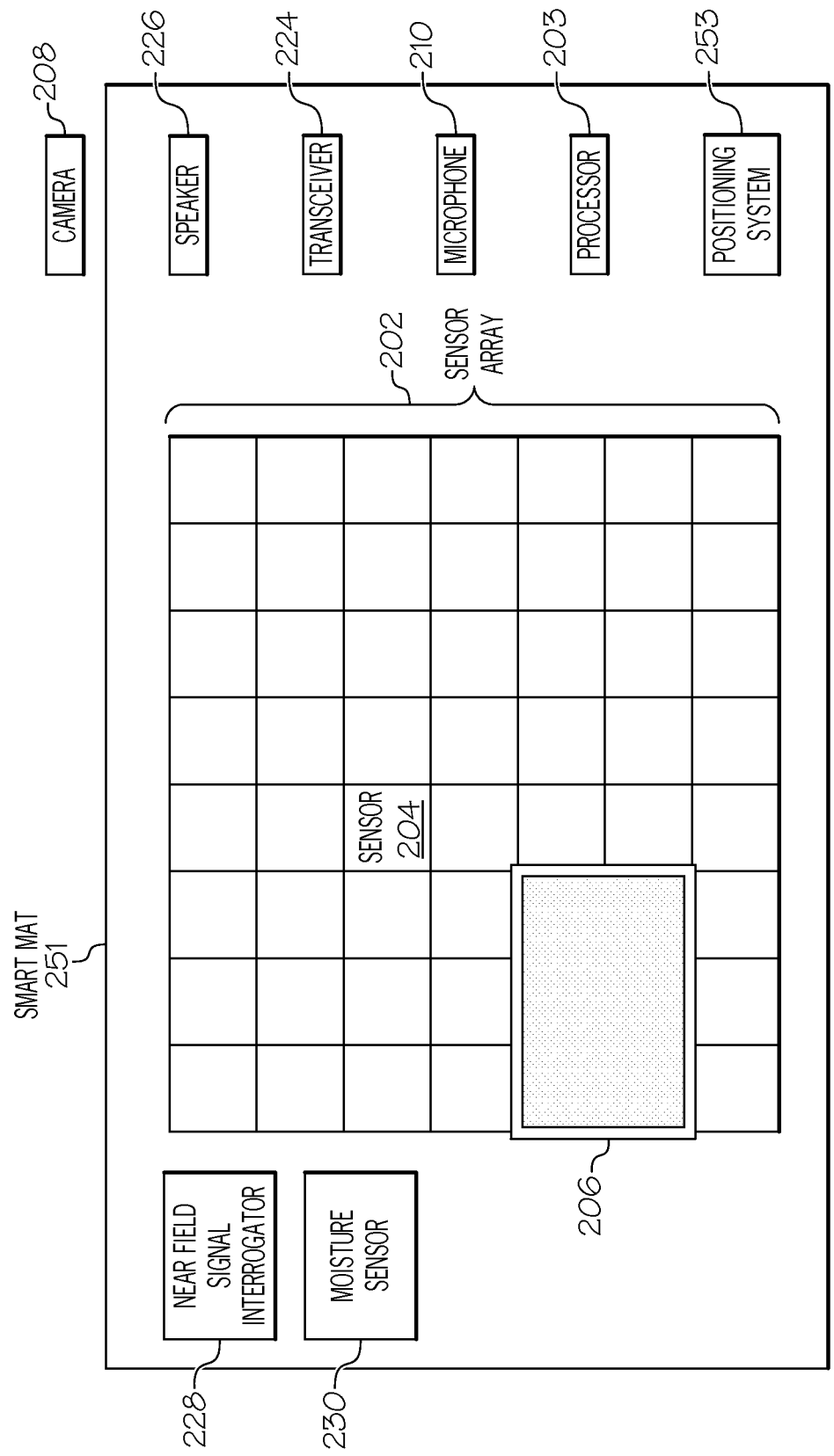
FIG. 2 illustrates an exemplary smart mat in accordance with one or more embodiments of the present invention.

With reference now to FIG. 2, details of an exemplary smart mat 251 (analogous to one of smart mats 151 depicted in FIG. 1) is presented. As shown in FIG. 2, smart mat 251 includes a sensor array 202, which is made up of a grid of sensors that include the depicted sensor 204. Thus, sensor 204 is combined with other sensors to form sensor array 202.

Sensor 204 is a variable pressure sensor, such as a mechanical strain gauge, a piezoelectric semiconductor device, etc. that is able to detect an intensity of pressure being applied thereon.

Sensor array 202 is able to detect 1) the weight and 2) shape of an object being placed on the smart mat 251. For example, assume that a package 206 is placed onto sensor array 202 on top of the sensors that are obscured in FIG. 2. By combining and evaluating the outputs from the obscured sensors, a processor 203 (analogous to processor 103 shown in FIG. 1) within the smart mat 251 can determine the weight and shape of package 206. This information can then be transmitted to a receiver in a delivery coordinating server or in another smart mat.

It is to be understood that package 206 may be any object delivered to smart mat 251, and may or may not be wrapped in a shipping container, box, or other package.

In an embodiment of the present invention, a camera 208 is positioned proximate to smart mat 251, such that a digital photograph and/or video of package 206 can be captured and transmitted to a user.

In an embodiment of the present invention, a microphone 210 is positioned proximate to or within smart mat 251. Microphone 210 is able to capture sounds, which are processed by processor 203. For example, a message may be displayed on smart mat 251 (on a digital display or simply printed in ink on top of smart mat 251) telling the delivery person to state information about the package 206, such as who it is from, what is in the package, etc.

Smart mat 251 also includes a positioning system 253 (analogous to positioning system 153), which determines the real-time geophysical position of the smart mat 251. This real-time geophysical position can be conveyed to a mobile device (e.g., mobile device 155 shown in FIG. 1) or other systems in a message transmitted by transceiver 224.

In an embodiment of the present invention, smart mat 251 includes, or is associated with, a speaker 226, which is able to reproduce sounds from audio files processed by processor 203. For example, speaker 226 may produce an audible message instructing a delivery person/vehicle to perform certain actions (e.g., returning a delivery, rerouting a delivery, etc.), providing information about an owner/user of the smart mat 251 (e.g., providing oral acceptance of a delivery package), etc.

In an embodiment of the present invention, smart mat 251 includes, or is associated with, a near field signal interrogator 228. Near field signal interrogator 228 interrogates a device to ascertain the identity of the device. For example, near field signal interrogator 228 may be a near field communication (NFC) device that interrogates a smart phone or other device to identify that smart phone and/or the user who owns/uses that smart phone (i.e., the smart phone in the possession of a person who is delivering or removing package 206 to/from smart mat 251). Alternatively, near field signal interrogator 228 may be a radio frequency identifier (RFID) interrogator that interrogates an RFID chip. This RFID chip may be worn by a particular entity, such as a particular person or a particular delivery vehicle. As such, the near field signal interrogator 228 can identify the entity that delivered the package 206 and/or removed the package 206 from the smart mat 251. Similarly, the RFID chip being interrogated by near field signal interrogator 228 may be affixed to package 206, thus allowing he smart mat 251 to ascertain information about package 206, such as what it is, who sent it, who ordered it, etc.

In an embodiment of the present invention, smart mat 251 includes, or is associated with, a moisture sensor 230. Moisture sensor 230 is able to detect if package 206 is getting wet (e.g., from rain, a sprinkler system, etc.). If so, then processor 203 processes output signals from moisture sensor 230 to create an moisture alert signal, which is sent by transmitter 224 to a mobile device (e.g., a smart phone) used by an owner/user of smart mat 251.

Figure 3:
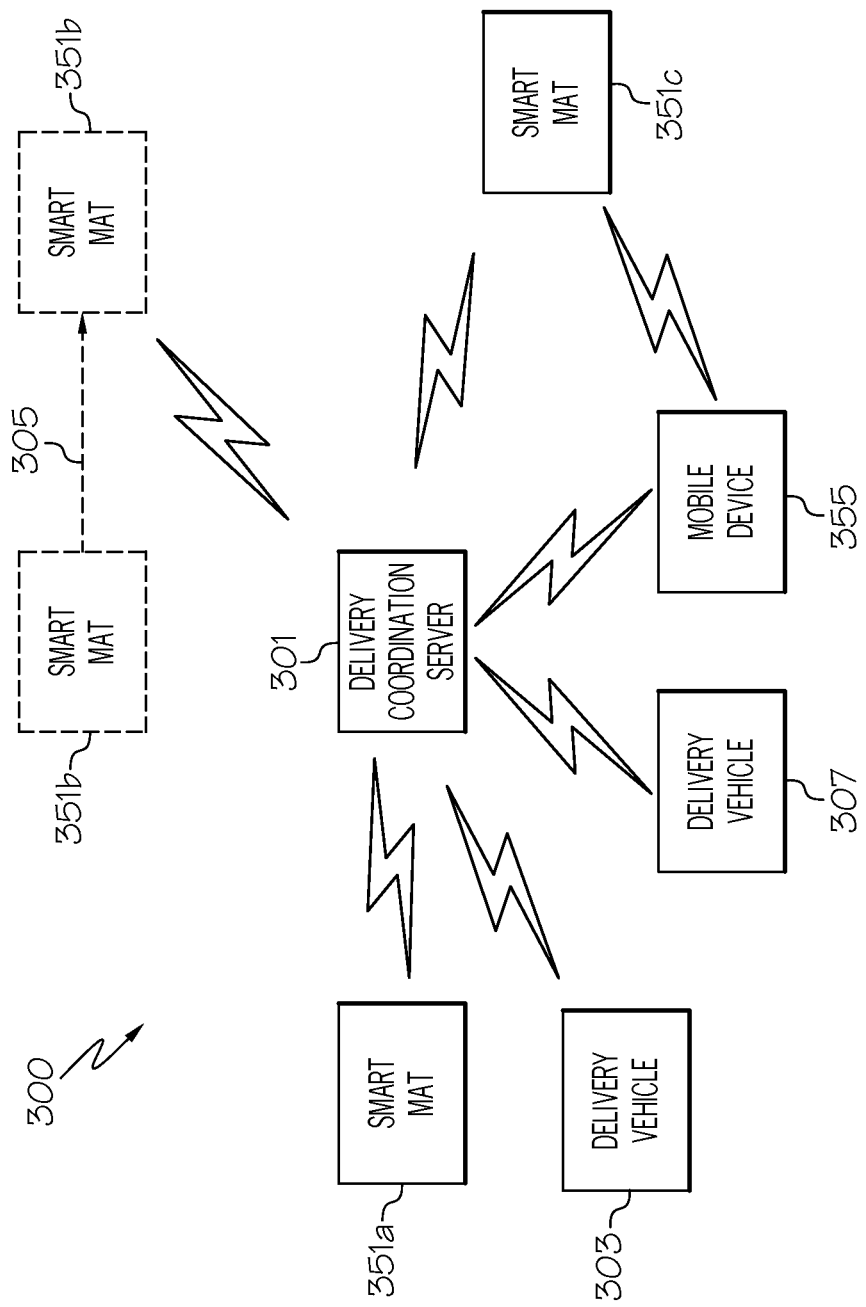
FIG. 3 depicts a network of smart mats in accordance with one or more embodiments of the present invention.

With reference now to FIG. 3, a dynamic delivery system 300 includes a delivery coordination server 301 (analogous to computer 101 shown in FIG. 1) and multiple smart mats 351a-351c (analogous to smart mat 251 shown in FIG. 2). As described herein, assume that a package is scheduled for delivery by delivery coordination server 301 from a supplier (not shown). In a traditional hub-based delivery system, the supplier and delivery coordination server 301 would deliver the package to a fixed address specified by the person who placed an order for the package/good. However, since smart mats 351a-351c are 1) mobile and 2) able to transmit their location in real time, the delivery coordination server 301 is able to dynamically adjust the movement of a delivery vehicle 303 to travel to certain smart mats.

For example, assume that delivery vehicle 303 (e.g., an airborne drone, a self-driving vehicle, a manually controlled vehicle, etc.) is carrying Product A and Product B. Assume further that Product A is scheduled to be left on smart mat 351a (e.g., based on instructions from the person who placed the order), and Product B is set to be left on smart mat 351b. Once the delivery vehicle 303 delivers Product A to smart mat 351a, it then determines where smart mat 351b is positioned in real time.

If smart mat 351b is still located at a location that is near the location of smart mat 351a (i.e., the position shown at the tail of dashed arrow 305), then delivery vehicle 303 will deliver Product B to smart mat 351b at that location. However, if smart mat 351b has moved to a new location (i.e., the position shown at the head of dashed arrow 305), then delivery coordination server 301 may determine that it is impractical for delivery vehicle 303 to deliver Product B. Rather, delivery vehicle 303 will be directed to transfer Product B onto delivery vehicle 307, which has been previously scheduled to deliver a Product C to smart mat 351c, which is now physically near smart mat 351*b*. Thus, delivery vehicle 307 will deliver Product B to smart mat 351*b*.

That is, smart mats 351*a*-351*c* are telling delivery coordination server 301 their real-time locations (e.g., using a positioning system such as positioning system 153 shown in FIG. 1). Based on this information, the delivery coordination server 301 will dynamically adjust which delivery vehicle will leave a particular package/product/good/order on a particular smart mat.

As shown in FIG. 3, a mobile device 355 (analogous to mobile device 155 shown in FIG. 1) is able to communicate (wirelessly or otherwise) with delivery coordinating server 301 and/or one or more of the smart mats 351*a*-351*c*. Thus, when a packaged is placed on one of the smart mats 351*a*-351*a*, the delivery coordinating server 301 and/or one or more of the smart mats 351*a*-351*c* is able to send a message to a mobile device 355 (analogous to mobile device 155 shown in FIG. 1) notifying a user of the delivery.

Very often, a mail delivery entity (person, drone, robot, etc.) leaves a package for a recipient at a front porch of a residence or business. As described herein, a smart mat is sensitive to the presence, weight, and shape of the package.

In an embodiment of the present invention, when the smart mat detects the delivered package, a transceiver (e.g., transceiver 224 shown in FIG. 2) sends a signal (e.g., a short messaging service text message, an e-mail, etc.) to a smart phone (i.e., a cellular phone capable of receiving text message via a cellular network and/or e-mails via Internet access) indicating that a package has been delivered.

In order to increase the confidence level of identifying the delivered package, the delivery coordination server 301 and/or smart mat 251 may access order histories, user location information, etc. For example, the delivery coordination server 301 and/or smart mat 251 may be sent a message from an order fulfillment service (i.e., a delivery service) that a specific package of a particular size and weight is scheduled for delivery at a certain date/time. If a package of that size and weight is delivered and placed on the smart mat 251, then the smart mat 251 can confidently send a message to a user informing that user that the specific package has been delivered (along with a description of what is in the package), as ascertained from information provided by the order fulfillment service.

In an embodiment of the present invention, the delivery coordination server 301 and/or smart mat 251 examine a profile of a user of a particular smart mat and/or a location of a specific smart mat in order to ascertain what is in the package and/or whether the delivery is proper.

For example, assume that a user of smart mat 351*a* has an order history of ordering certain items routinely. Assume further that a record of packages left on smart mat 351*a* confirms that such items have routinely been delivered in packages that weigh 1-2 pounds. However, if a package weighing 30 pounds were delivered to smart mat 351*a*, this would be anomalous. Depending on the location of smart mat 351*a*, such as delivery may be deemed to 1) be a mistaken delivery, or 2) pose a threat.

For example, assume that smart mat 351*a* is in front of a control room at a petrochemical plant, and that employees routinely order a lunch delivery weighing 1-2 pounds to be delivered every day at noon, and that such lunch orders are left on the smart mat 351*a*. If a package arrives weighing 30 pounds, and no such heavy packages have ever been left on smart mat 351*a*, then this will raise an alert that there could be a dangerous item in the heavy package. This may be particularly critical since the control room presents a sensitive location (i.e., damage to the control room could have catastrophic consequences to the petrochemical plant). However, if an anomalous package (e.g., of an unusual size or weight) were left on a residential porch, then the system will likely conclude that the delivery was simply a mistake.

As discussed in FIG. 2, a smart mat 251 may include a system of pressure sensors (sensor array 202) that detect the shape and weight of a package. However, sensor array 202 may utilize other types of sensors, such as a bar code reader, a radio-frequency identification device (RFID) reader, a digital camera, an ultrasonic range finder, a shock detector (such as an accelerometer), or an audio detector. The type of sensor or sensors used will determine the type of information may be sent (e.g. via a text message to one or more users). For example, a bar code reader may result in the recording of and forwarding of detailed item information. A shock detector may simply result in an indication that an item has been deposited on the smart mat.

In an embodiment of the present invention, a digital camera (e.g., camera 208 shown in FIG. 2) takes a photo of the item when it is placed on the smart mat. This information may then be sent as a message to a user, either directly from the smart mat (e.g., smart mat 351*a* shown in FIG. 3) or from a delivery coordinating server (e.g., delivery coordinating server 301 shown in FIG. 3).

In an embodiment of the present invention, an audio sensor (e.g., microphone 210 shown in FIG. 2) receives audio information from the individual making the delivery. That is, the individual delivering package 206 to smart mat 251 may orally describe the delivered item, or leave some other message for the recipient, which is picked up by microphone 210 and/or recorded by processor 203. This verbal information/recoding can then be sent to a mobile device that is used by a user.

In an embodiment of the present invention, the smart mat functions as a staging platform. That is, rather than stage products for delivery at a warehouse, a smart mat can receive multiple delivered products from a vehicle or person, including products that are not addressed/destined for the location/person associated with that smart mat. Thus, other vehicles/delivery persons will later pick up the products that are not addressed/destined for the location/person associated with that smart mat, and will transport them to the smart mat to which they have been addressed. Thus, the smart mats 351*a*-351*c* shown in FIG. 3 function as a dynamically configurable multiple node system, rather than a hub-based system (in which central warehouses stage products for delivery).

In an embodiment of the present invention, a first smart mat redirects delivery of products to a second smart mat. For example, assume that a particular product has been set upon a first smart mat, which is the identified destination for that particular product/delivery. However, the user/owner of the first smart mat may be out of town, and wishes for a neighbor (e.g., an owner/user of a second smart mat) to receive any deliveries that were addressed to the first smart mat. The first smart mat will therefore direct the particular product/delivery to be delivered to the second smart mat, rather than the first smart mat. This rerouting can occur in various manners in various embodiments of the present invention.

In a first embodiment of the present invention, a sensor (e.g., sensor array 202 in FIG. 2) detects a presence of package 206. Thereafter, a message can be announced from speaker 226 directing the delivery entity (person, vehicle, etc.) to leave the package 206 at another location (e.g., at a house next door).

In a second embodiment, a sensor (e.g., sensor array 202 in FIG. 2) detects a presence of package 206 at a first smart mat. Thereafter, a message is transmitted from transceiver 224 directing the delivery entity (person, vehicle, etc.) to leave the package 206 at a second smart mat. The message identifies 1) an unique identifier for the second smart mat, and/or 2) a real-time location of the second smart mat. That is, the first smart mat and the second smart mat are part of in intelligent Internet of Things (IoT) that are able to communicate with one another. Thus, if the first smart mat merely identifies the unique identifier for the second smart mat, then the delivery entity will look up the current location of the second smart mat using this unique identifier and a lookup table. If the first smart mat and the second smart are in communication with one another (as part of an IoT), then the first smart mat can directly give the delivery entity the current location of the second smart mat, based on geophysical coordinates provided by the second smart mat's positioning system 253, which are sent by the transceiver 224 in the second smart mat to the transceiver 224 in the first smart mat.

In an embodiment of the present invention in which the package 206 shown in FIG. 2 is identified (e.g., by an enterprise that is selling/delivering the package to the smart mat) as being a high-value product, camera 208 will photograph the environment around the smart mat 251 when the sensor array 202 detects that the high-value package 206 is being lifted off the smart mat 251. Thus, the owner of the smart mat 251 will have a photographic record of whoever took the package. The photograph taken by the camera 208 may be transmitted to a mobile device registered for use by the owner/user of the smart mat 251. If that owner/user does not recognize the person who took the package 206, then the owner/user can file a report with the appropriate authorities.

In an embodiment of the present invention, the near field signal interrogator 228 shown in FIG. 2 will determine the identity of the entity that is removing the package 206, by interrogating an RFID chip worn by that entity (person, drone, etc.) or by interrogating a near field communication (NFC) enabled device (e.g., a smart phone capable of NFC communication) to ascertain the identity of that NFC enabled device and/or its owner/user.

As described above, each smart mat provides a mobile delivery node to which a product is delivered. As such, any entity that is able to identify the location of a particular smart mat (e.g., using positioning system 253 shown in FIG. 2), but also local weather conditions (e.g., using moisture sensor 230 shown in FIG. 2).

In one embodiment of the present invention, the location of a particular smart mat is predicted based on past location histories for that particular smart mat. For example, assume that delivery coordination server 301 shown in FIG. 3 has received past location signals (based on signals from positioning system 253 shown in FIG. 2) describing where smart mat 351b was located every Friday for the past three months. These location signals show that smart mat 351b was at Location A on Friday mornings, and that smart mat 351b was at Location B on Friday afternoon. If a delivery is scheduled for the following Friday afternoon, then delivery coordination server 301 will direct delivery vehicle 303 or delivery vehicle 307 to deliver a package to Location B rather than Location A.

Given that under certain embodiments smart mats may be moved in space and still receive packages, the present invention dynamically configures delivery networks, such that drivers or driverless delivery vehicles may move goods over certain distances in the network between smart mats (delivery and pickup from smart mats). An example of such a network is a drone mesh network. As described above, the present invention allows smart mats to take the place of delivery hubs (e.g., warehouses or other staging areas). The present system provides the advantage of having smart mats that can be physically moved in space, whereas fixed hubs cannot. Thus, the present invention optimizes the efficiency of the delivery network/system.

Figure 4:
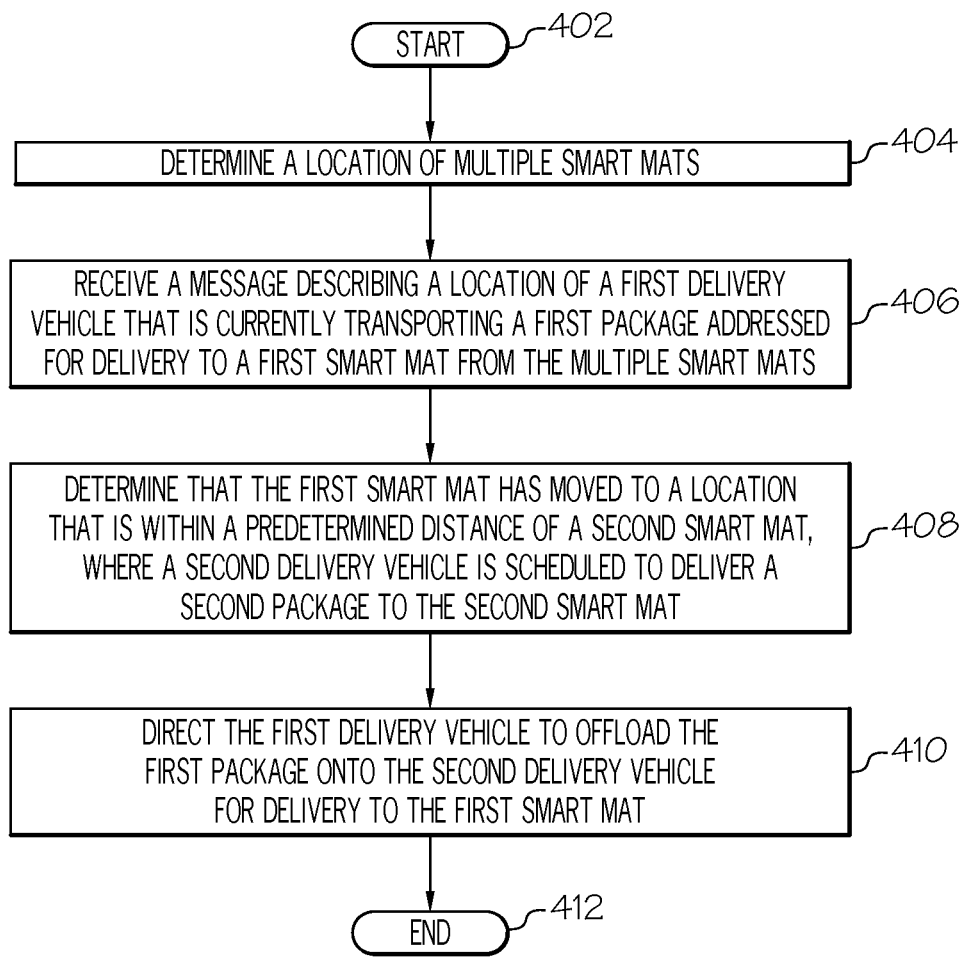
FIG. 4 is a high-level flow chart of one or more steps performed by one or more processors and/or other hardware devices to dynamically configure a delivery system for the delivery of products to smart mats, according to one embodiment of the present invention.

With reference now to FIG. 4, a high-level flow chart of one or more steps performed by one or more processors and/or other hardware devices to dynamically configure a delivery system for delivering products to smart mats is presented.

After initiator block 402, a delivery coordination server (e.g., delivery coordination server 301 shown in FIG. 3) determines a location of multiple smart mats (e.g., smart mats 351a-351c), as described in block 404. As depicted in FIG. 2, each of the smart mats includes a positioning system (e.g., positioning system 253) and a transmitter (e.g., transceiver 224). As described herein, the positioning system determines a real-time geophysical location of each of the smart mats, and the transmitter transmits a message describing the real-time geophysical location of said each of the smart mats (as ascertained by positioning system 253).

As described in block 406, the delivery coordination server receives a message describing a location of a first delivery vehicle (e.g., delivery vehicle 303 shown in FIG. 3) that is currently transporting a first package addressed for delivery to a first smart mat (e.g., smart mat 351b shown in FIG. 3) from the multiple smart mats. That is, a positioning system (e.g., positioning system 153 shown in FIG. 1 when incorporated into an on-board computer (not shown) in delivery vehicle 303) is able to determine the real-time location of delivery vehicle 303, and can then transmit (using transceiver 123 when part of the on-board computer in delivery vehicle 303) that location to the delivery coordination server 301 and/or other deliver vehicles (e.g., delivery vehicle 307) and/or one or more of the smart mats 351a-351c depicted in FIG. 3.

As described in block 408, the deliver coordination server determines that the first smart mat (e.g., smart mat 351b shown in FIG. 3) has moved to a location that is within a predetermined distance of a second smart mat (e.g., smart mat 351c shown in FIG. 3). A second delivery vehicle (e.g., delivery vehicle 307) is scheduled to deliver a second package to the second smart mat. Thus, since the second delivery vehicle is going to be traveling to the location of smart mat 351c to deliver the second package, and since smart mat 351c is close to the new location of smart mat 351b to which the first package is to be delivered, then it is more efficient to have the second delivery vehicle 307 deliver the first package to the smart mat 351b instead of the first delivery vehicle 303.

Therefore, as described in block 410, the delivery coordination server directs the first delivery vehicle to transfer the first package to the second delivery vehicle for delivery to the first smart mat. This transference may be directly from one deliver vehicle to another vehicle (e.g., offloading the package from one drone to another), or it may be indirect, in which a first drone leaves the package at a particular smart mat, from which the other drone picks it up at a later time.

The flow chart ends at terminator block 412.

In an embodiment of the present invention the first delivery vehicle 303 and the second delivery vehicle 307 depicted in FIG. 3 are autonomously piloted vehicles, also known as drones. These drones may be airborne, waterborne, or land based. Regardless of the environment that these drone travel upon, they are all able to auto-pilot themselves and/or configure their delivery routes/schedules autonomously or under the direction of the delivery coordination server 301. Information from the smart mats that are used to configure the delivery routes/schedules include, but are not limited to, the location of the smart mats in real-time, real-time traffic conditions, time and financial constraints (for traveling to one smart mat over another), user preferences, etc.

In an embodiment of the present invention, one or more processors (e.g., within the delivery coordination server 301 and/or in one or more of the smart mats 351*a*-351*c* shown in FIG. 3) receive a signal from a sensor array (sensor array 202 depicted in FIG. 2) in the first smart mat. As described above, the signal (which is based on readings from the sensor array 202 and is transmitted via transceiver 224) describes a weight and size of the first package (e.g., package 206). A transmitter (within the smart mat and/or the delivery coordination server) then transmits a message to a mobile device (e.g., mobile device 355 shown in FIG. 3) describing the first package that has been delivered to the first smart mat. This description includes, but is not limited to, the size of the first package (e.g., using sensor array 202), the weight of the first package (e.g., using sensor array 202), the content of the first package (e.g., using near field signal interrogator 228 that interrogates an RFID chip or other device affixed to the first package), the sender of the first package (e.g., using a lookup table or other system for coordinating the identify of the first package with the identity of the entity who sent the first package, and/or by using microphone 210 to receive a verbal identification from the person delivering the first package), and/or whether or not the first package is getting or has gotten wet (e.g., using moisture sensor 230).

In an embodiment of the present invention, the system takes a picture of the person and/or vehicle that has delivered the first package to the first smart mat, and then sends a copy of that picture to a mobile device used by a person who owns/utilizes or is otherwise assigned usage of the first smart mat. Thus, in this embodiment one or more processors (e.g., within delivery coordination server 301 and/or one or more of the smart mats 351*a*-351*c*) receive a photographic image of the first package positioned on the first smart mat. The photographic image is captured by a camera (e.g., camera 208 shown in FIG. 2) that is positioned proximate to the first smart mat. A transmitter (e.g., transceiver 124 shown in FIG. 1 when incorporated into delivery coordination server 301 and/or transceiver 224 within the first smart mat) then transmits the photographic image to a mobile device (e.g., mobile device 355 shown in FIG. 3, such as a smart phone).

In an embodiment of the present invention, the person delivering the package states who sent the package, what is in the package, and/or the identify of the person who is delivering the package when he/she places the package on the smart map. A microphone (e.g., microphone 210 shown in FIG. 2) captures this voice message, and then sends it to a mobile device (e.g., a smart phone) used by a person who has packages delivered to the smart mat. Thus, one or more processors (e.g., processor 203 with smart mat 251 in FIG. 2) receive an audio message captured by a microphone that is positioned proximate to the first smart mat. The audio message describes a sender of the first package, a content of the first package, and an identity of a person who is delivering the first package to the first smart mat. A transmitter (e.g., transceiver 224 shown in FIG. 2) then transmits the audio message to a mobile device (e.g., mobile device 355 shown in FIG. 3).

In an embodiment of the present invention, the sensor array 202 in the smart mat 251 determines the weight and footprint (size and shape) of the first package, and then compares that information to other orders delivered to the smart mat in the past. For example, if a 3 pound package containing books has been delivered every week to the first smart mat for the past year, and a new 3 pound package arrives, the system (e.g., smart mat 251 shown in FIG. 2 and/or delivery coordination server 301 shown in FIG. 3) will assume/conclude that this new 3 pound package also contains books. Thus, in this embodiment one or more processors determine, based on readings from a sensor array in the first smart mat, a weight and footprint of the first package. Based on these readings, the processor(s) identify a content of the first package based on a product ordering history of a user of the first smart mat and the weight and footprint of the first package, and then transmit (via a transmitter such as transceiver 224 shown in FIG. 2) a message to a mobile device (e.g., mobile device 355 shown in FIG. 3) describing the content of the first package.

In an embodiment of the present invention, the system issues an alert if an unauthorized person removed the delivered package from the smart mat. That is, the sensor array 202 shown in FIG. 2 detects that the package 206 has been lifted off the smart mat 251. However, a removal code must be entered into a computer system in order to indicate that the removal of the package 206 is authorized. This removal code may be entered into a keypad on a user's smart phone (that is linked to the smart mat 251), or it may be emitted from an RFID chip worn by an authorized user, which is recognized by the near field signal interrogator 228 shown in FIG. 2), or it may be spoken into the microphone 210 in FIG. 2, and/or is otherwise entered into the processor 203 shown in FIG. 2 in smart mat 251 and/or into a processor 103 in the delivery coordination server 301 shown in FIG. 3. Thus, in this embodiment one or more processors determine, based on readings from a sensor array in the first smart mat, that the first package has been removed from the first smart mat. The processor(s) then determine that a removal code (authorizing removal of the package from the smart mat) has not been entered on a computer system (i.e., the removal code authorizes the first package to be removed from the first smart mat). In response to determining that the removal code has not been entered on the computer system, a transmitter (e.g., transceiver 224 shown in smart mat 251) transmits an alert (e.g., to mobile device 355 and/or delivery coordinating server 301) indicating that an unauthorized removal of the first package from the first smart mat has occurred.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
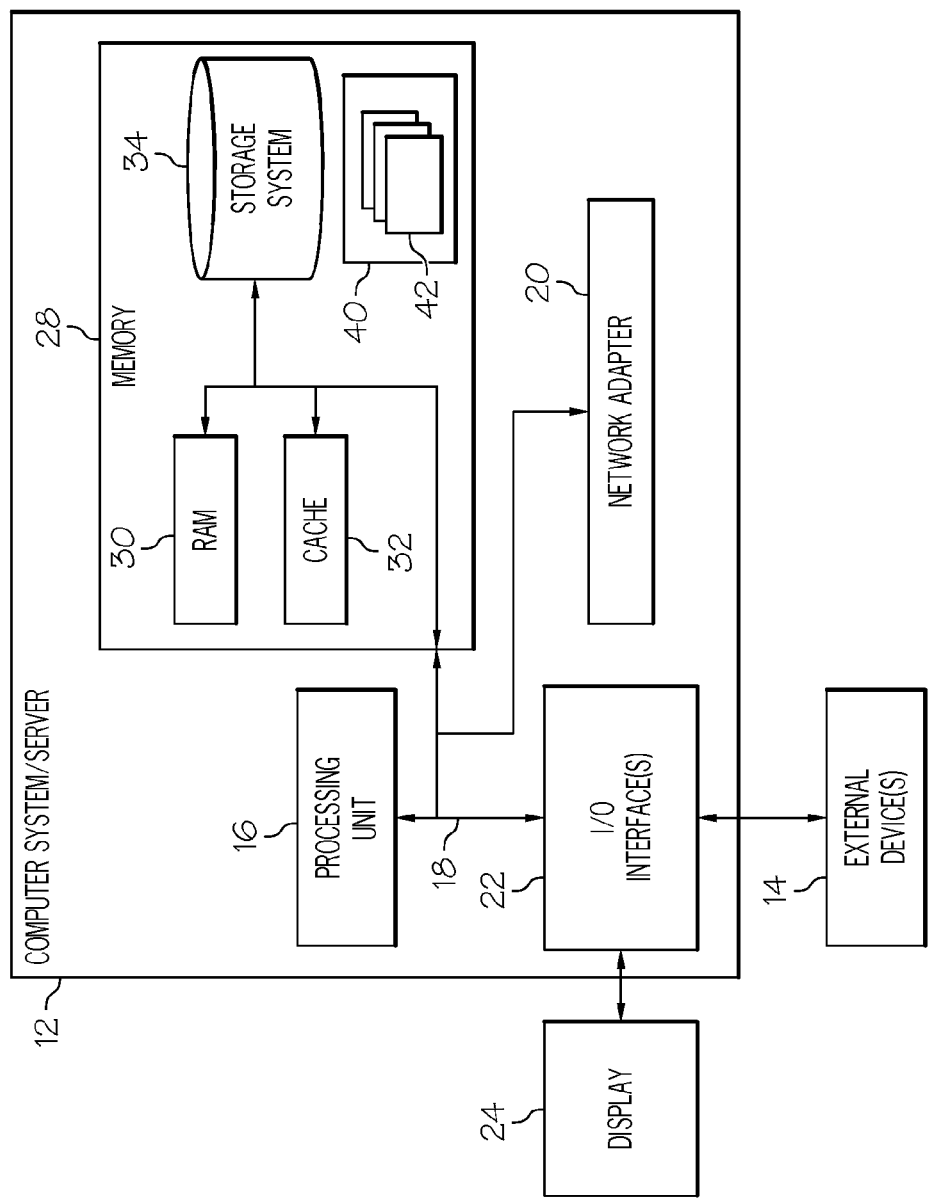
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
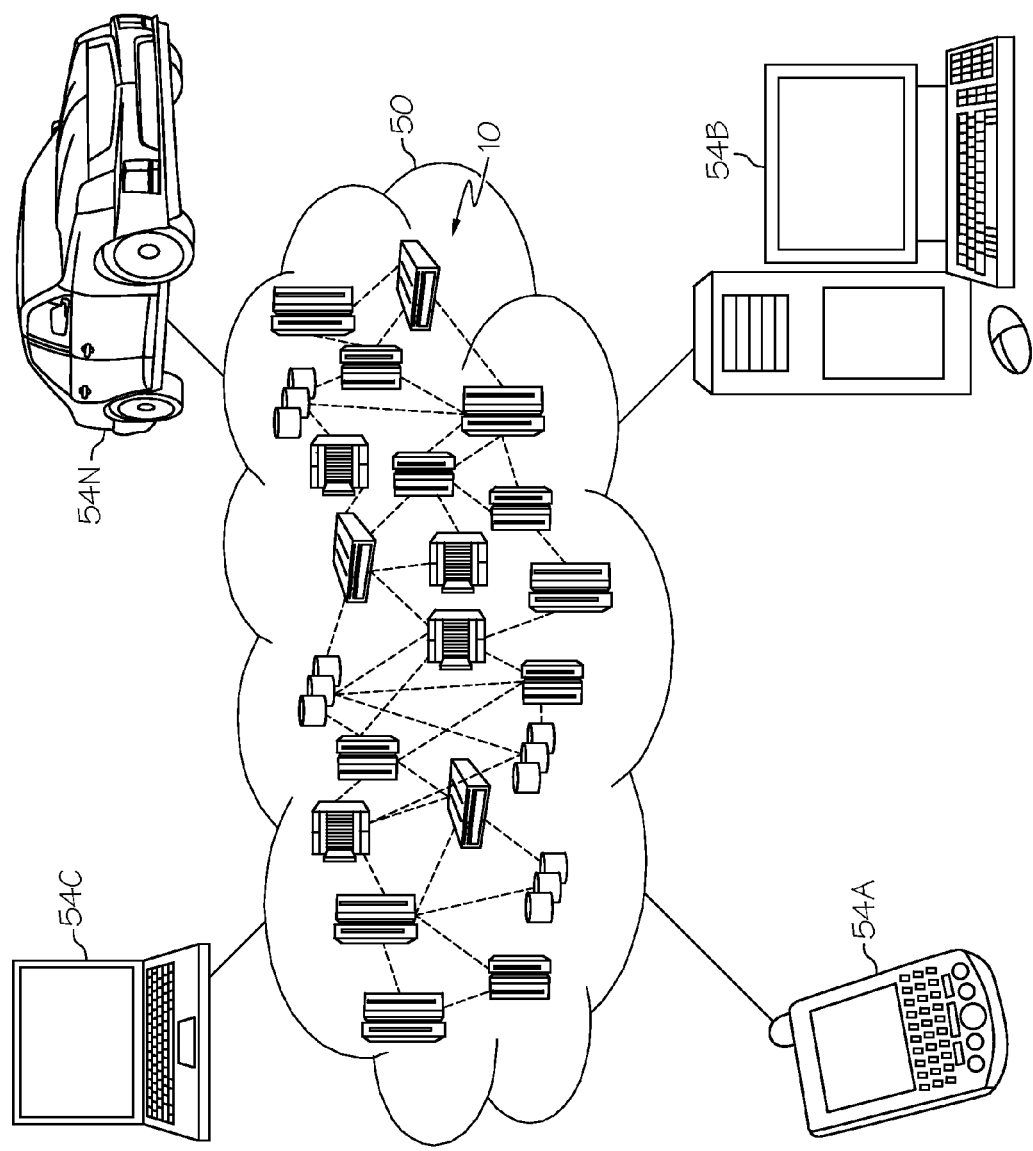
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 6 are intended to be illustrative only and that computing nodes 10 and cloud computing environment 50 can communicate with any type of computerized device over any type of network and/or network addressable connection (e.g., using a web browser).

Figure 7:
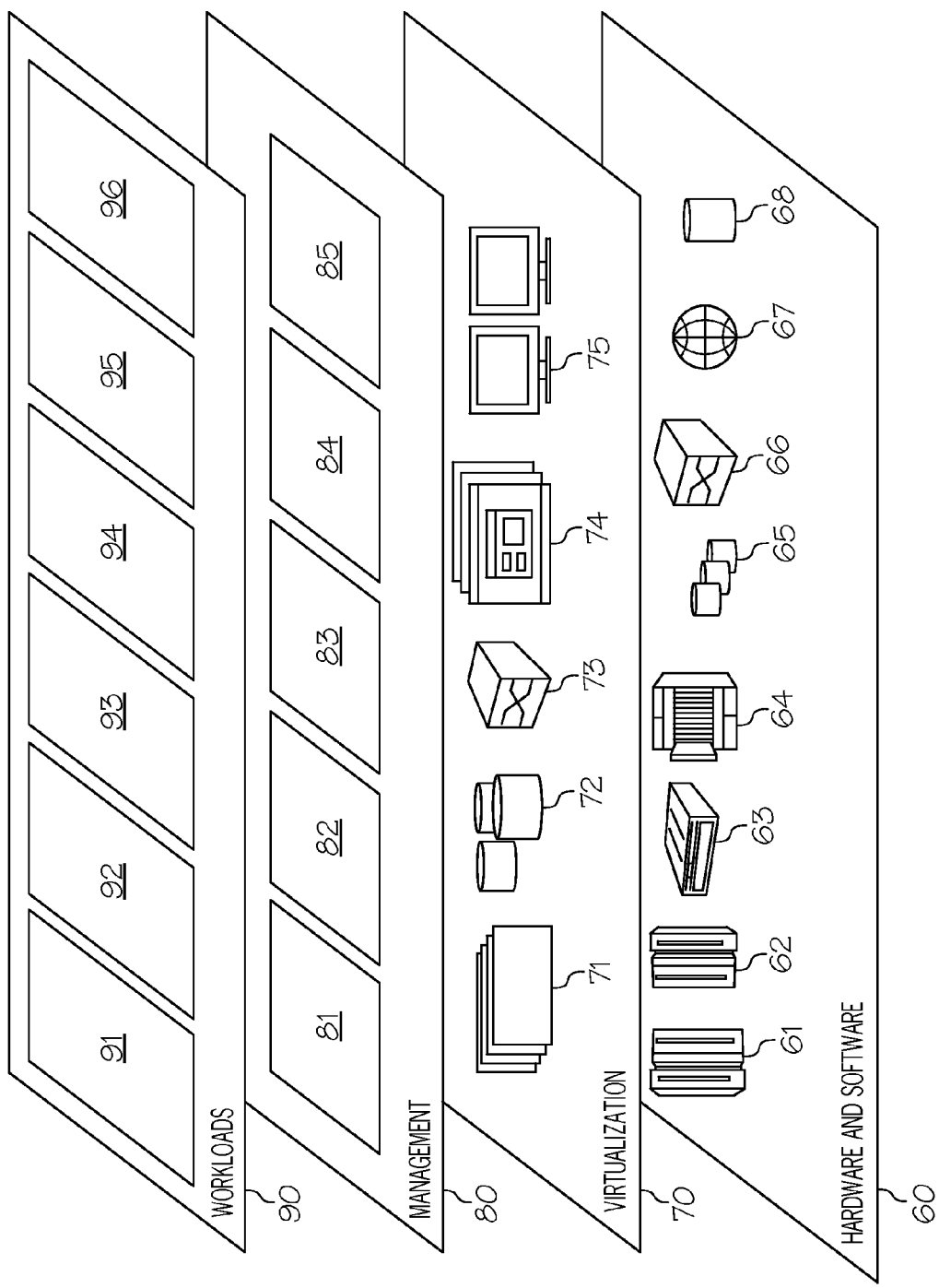
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and delivery system configuration processing 96 (for dynamically configuring a delivery system for delivering products to smart mats as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of dynamically configuring a delivery system for delivering products to smart mats, the method comprising:
    determining, by a delivery coordination server, a location of multiple smart mats, wherein each of the smart mats comprises:
        a positioning system, wherein the positioning system determines a real-time geophysical location of said each of the smart mats; and
        a transmitter, wherein the transmitter transmits a message describing the real-time geophysical location of said each of the smart mats;
    receiving, by the delivery coordination server, a message describing a location of a first delivery vehicle that is currently transporting a first package addressed for delivery to a first smart mat from the multiple smart mats;
    determining, by the delivery coordination server, that the first smart mat has moved to a location that is within a predetermined distance of a second smart mat, wherein a second delivery vehicle is scheduled to deliver a second package to the second smart mat; and
    directing, by the delivery coordination server, the first delivery vehicle to transfer the first package to the second delivery vehicle for delivery to the first smart mat.

2. The method of claim 1, wherein the first delivery vehicle and the second delivery vehicle are autonomously piloted vehicles.

3. The method of claim 1, further comprising:
    receiving, by one or more processors, a signal from a sensor array in the first smart mat, wherein the signal describes a weight and size of the first package; and
    transmitting, by a transmitter, a message to a mobile device describing the first package that has been delivered to the first smart mat.

4. The method of claim 1, further comprising:
    receiving, by one or more processors, a photographic image of the first package positioned on the first smart mat, wherein the photographic image is captured by a camera that is positioned proximate to the first smart mat; and
    transmitting, by a transmitter, the photographic image to a mobile device.

5. The method of claim 1, further comprising:
    receiving, by one or more processors, an audio message captured by a microphone that is positioned proximate to the first smart mat, wherein the audio message describes a sender of the first package, a content of the first package, and an identity of a person who is delivering the first package to the first smart mat; and
    transmitting, by a transmitter, the audio message to a mobile device.

6. The method of claim 1, further comprising:
    determining, by one or more processors and based on readings from a sensor array in the first smart mat, a weight and footprint of the first package;
    identifying, by one or more processors, a content of the first package based on a product ordering history of a user of the first smart mat and the weight and footprint of the first package; and
    transmitting, by a transmitter, a message to a mobile device describing the content of the first package.

7. The method of claim 1, further comprising:
    determining, by one or more processors and based on readings from a sensor array in the first smart mat, that the first package has been removed from the first smart mat;
    determining, by one or more processors, that a removal code has not been entered on a computer system, wherein the removal code authorizes the first package to be removed from the first smart mat; and
    in response to determining that the removal code has not been entered on the computer system, transmitting, by a transmitter, an alert indicating that an unauthorized removal of the first package from the first smart mat has occurred.

8. A computer program product for dynamically configuring a delivery system for delivering products to smart mats, the computer program product comprising a non-transitory computer readable storage medium having program code embodied therewith, the program code readable and executable by one or more processors to perform a method comprising:
    determining a location of multiple smart mats, wherein each of the smart mats comprises:
        a positioning system, wherein the positioning system determines a real-time geophysical location of said each of the smart mats; and
        a transmitter, wherein the transmitter transmits a message describing the real-time geophysical location of said each of the smart mats;

receiving a message describing a location of a first delivery vehicle that is currently transporting a first package addressed for delivery to a first smart mat from the multiple smart mats;

determining that the first smart mat has moved to a location that is within a predetermined distance of a second smart mat, wherein a second delivery vehicle is scheduled to deliver a second package to the second smart mat; and directing the first delivery vehicle to transfer the first package to the second delivery vehicle for delivery to the first smart mat.

9. The computer program product of claim 8, wherein the first delivery vehicle and the second delivery vehicle are autonomously piloted vehicles.

10. The computer program product of claim 8, wherein the method further comprises:

receiving a signal from a sensor array in the first smart mat, wherein the signal describes a weight and size of the first package; and transmitting, via a transmitter, a message to a mobile device describing the first package that has been delivered to the first smart mat.

11. The computer program product of claim 8, wherein the method further comprises:

receiving a photographic image of the first package positioned on the first smart mat, wherein the photographic image is captured by a camera that is positioned proximate to the first smart mat; and transmitting, via a transmitter, the photographic image to a mobile device.

12. The computer program product of claim 8, wherein the method further comprises:

receiving an audio message captured by a microphone that is positioned proximate to the first smart mat, wherein the audio message describes a sender of the first package, a content of the first package, and an identity of a person who is delivering the first package to the first smart mat; and transmitting, via a transmitter, the audio message to a mobile device.

13. The computer program product of claim 8, wherein the method further comprises:

determining, based on readings from a sensor array in the first smart mat, a weight and footprint of the first package;

identifying a content of the first package based on a product ordering history of a user of the first smart mat and the weight and footprint of the first package; and transmitting, via a transmitter, a message to a mobile device describing the content of the first package.

14. The computer program product of claim 8, wherein the method further comprises:

determining, based on readings from a sensor array in the first smart mat, that the first package has been removed from the first smart mat;

determining that a removal code has not been entered on a computer system, wherein the removal code authorizes the first package to be removed from the first smart mat; and in response to determining that the removal code has not been entered on the computer system, transmitting, via a transmitter, an alert indicating that an unauthorized removal of the first package from the first smart mat has occurred.

15. A computer system comprising:

a processor, a computer readable memory, and a non-transitory computer readable storage medium;

first program instructions to determine a location of multiple smart mats, wherein each of the smart mats comprises:

a positioning system, wherein the positioning system determines a real-time geophysical location of said each of the smart mats; and a transmitter, wherein the transmitter transmits a message describing the real-time geophysical location of said each of the smart mats;

second program instructions to receive a message describing a location of a first delivery vehicle that is currently transporting a first package addressed for delivery to a first smart mat from the multiple smart mats;

third program instructions to determine that the first smart mat has moved to a location that is within a predetermined distance of a second smart mat, wherein a second delivery vehicle is scheduled to deliver a second package to the second smart mat; and fourth program instructions to direct the first delivery vehicle to transfer the first package to the second delivery vehicle for delivery to the first smart mat; and wherein the first, second, third, and fourth program instructions are stored on the computer readable storage medium and executed by the processor via the computer readable memory.

16. The computer system of claim 15, wherein the first delivery vehicle and the second delivery vehicle are autonomously piloted vehicles.

17. The computer system of claim 15, further comprising:

fifth program instructions receive a signal from a sensor array in the first smart mat, wherein the signal describes a weight and size of the first package; and sixth program instructions to transmit, via a transmitter, a message to a mobile device describing the first package that has been delivered to the first smart mat; and wherein the fifth and sixth program instructions are stored on the computer readable storage medium and executed by the processor via the computer readable memory.

18. The computer system of claim 15, further comprising:

fifth program instructions to receive an audio message captured by a microphone that is positioned proximate to the first smart mat, wherein the audio message describes a sender of the first package, a content of the first package, and an identity of a person who is delivering the first package to the first smart mat; and sixth program instructions to transmit, via a transmitter, the audio message to a mobile device; and wherein the fifth and sixth program instructions are stored on the computer readable storage medium and executed by the processor via the computer readable memory.

19. The computer system of claim 15, further comprising:

fifth program instructions to determine, based on readings from a sensor array in the first smart mat, a weight and footprint of the first package;

sixth program instructions to identify a content of the first package based on a product ordering history of a user of the first smart mat and the weight and footprint of the first package; and seventh program instructions to transmit, via a transmitter, a message to a mobile device describing the content of the first package; and wherein the fifth, sixth, and seventh program instructions are stored on the computer readable storage medium and executed by the processor via the computer readable memory.

20. The computer system of claim 15, further comprising:

fifth program instructions to determine, based on readings from a sensor array in the first smart mat, that the first package has been removed from the first smart mat;

sixth program instructions to determine that a removal code has not been entered on a computer system, wherein the removal code authorizes the first package to be removed from the first smart mat; and seventh program instructions to, in response to determining that the removal code has not been entered on the computer system, transmit, via a transmitter, an alert indicating that an unauthorized removal of the first package from the first smart mat has occurred; and wherein the fifth, sixth, and seventh program instructions are stored on the computer readable storage medium and executed by the processor via the computer readable memory.

* * * * *